Feb. 21, 1928.

O. M. SUMMERS

VALVE CAP

Filed June 27, 1923

1,659,751

Inventor
Otto M. Summers.
By J. Ralph Fehr
His Attorney

Patented Feb. 21, 1928.

1,659,751

UNITED STATES PATENT OFFICE.

OTTO M. SUMMERS, OF DAYTON, OHIO.

VALVE CAP.

Application filed June 27, 1923. Serial No. 648,130.

The present invention relates to means for sealing valves and particularly valves of the type used in the inflation of pneumatic tires.

It has for an object the provision of an improved valve cap having a rubber gasket which is so bounded and confined in the cap that the latter may be forced under great pressure against the end of a cooperating valve stem to hermetically seal the same. Other objects will appear from the following description.

Figure 1:
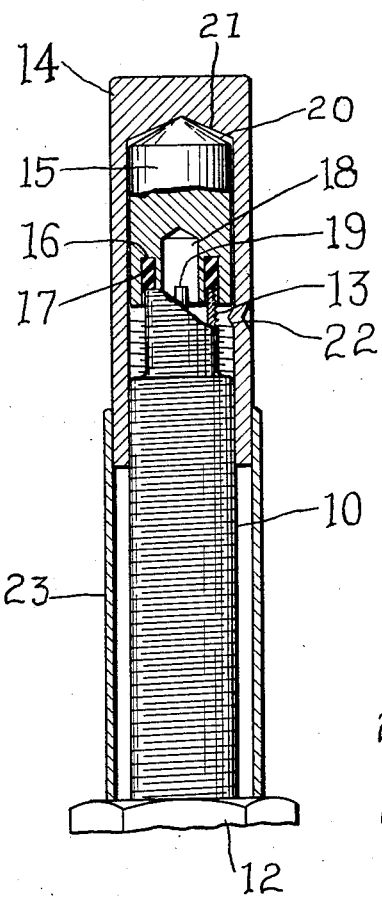
Figure 2:
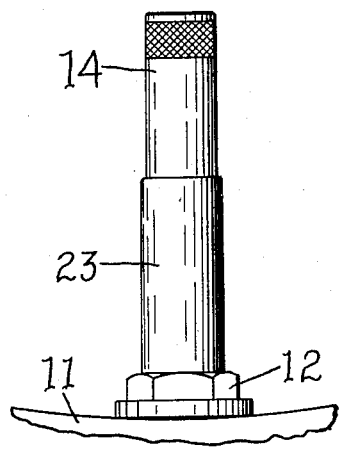
Figure 3:
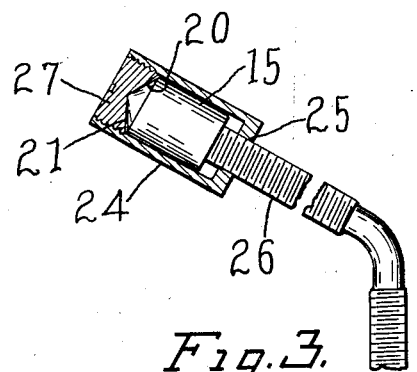

In the drawings, Fig. 1 is a longitudinal sectional view of the valve cap applied to a conventional valve stem or casing, the latter being shown in elevation. Fig. 2 is an elevation of the valve cap showing its application to a straight valve stem. Fig. 3 is side elevational, partly in section, showing a modified form of the valve cap applied to a bent valve stem.

Referring to Fig. 1, 10 is a straight valve stem or casing of the type commonly found on pneumatic tires used in automobiles. The valve stem extends through an opening in the rim 11 and is held immovable with respect to the rim by means of a nut 12 cooperating with the outer threaded surface of the stem. As is usual in valves of the type illustrated, the valve stem is hollow throughout its length and has a reduced end portion, thus providing a thin-walled tubular end portion 13 of circular section.

The valve casing cap comprises a screw cap 14 adapted to engage the screw threaded portion of the valve stem or casing at its larger diameter, and a compression or packing carrying member 15 within the screw cap and adapted to engage the reduced end of the valve stem. The compression cap is cylindrical and coaxial with respect to the axis of the valve stem. The end of the compression cap adjacent the valve stem is provided with a circular groove 16 slightly wider than the thickness of the wall of the valve end portion. In the bottom of the groove there is a circular or ring like gasket of packing material which may be pure gum rubber or other suitable elastic or relatively soft compressible sealing material. The compression member is also provided with a bore or depression 18 adapted to receive the projecting portion of valve rod 19, the bore 18 being of such a size that there can be no contact with the valve rod. The upper end of compression member 15 is cone-shaped as at 20 and engages a similarly shaped surface 21 on the interior of the cap 14 as shown, thereby providing an anti-friction bearing between them. The compression member 15 is loosely and slidably fitted within the cap 14, and the latter is provided with a shoulder 22 formed in its wall to hold the compression member from falling out when the screw cap is lifted from the valve stem.

In applying the present invention to a valve stem, the screw cap 14 is placed over the end of the valve stem and screwed down until the reduced tubular end portion of the valve stem or casing enters the groove 16 and seats upon the gasket or packing material 17 therein. The inner and outer walls of the valve stem or casing are in such close proximity to the inner and outer walls of the groove 16 that the rubber gasket is locked in the groove. It is well known that rubber, when thus confined, is practically incompressible and hence it is obvious that the sealing member 15 may be forced to its seat with a tremendous pressure to seal the valve stem or casing. Such pressure is applied by screwing down the screw cap 14 as already described, or by any other suitable or desired means. The anti-friction bearing surfaces 20 and 21 permit the screw cap 14 to be rotated freely with respect to the compression member 15 while exerting a tremendous pressure thereon, thereby saving the gasket 17 from the destructive action of combined pressure and rotation found in known types of valves and at the same time effecting a more perfect seal between the gasket and the valve stem.

The screw cap 14 is provided with a sleeve 23 frictionally mounted thereon. This sleeve is slidable and rotatable on the cap 14 and may be adjusted thereon so as to contact with the nut 12 to protect the exposed threaded outer surface of the valve stem and at the same time to improve the appearance of the assembly.

Fig. 3 shows the present invention applied to the bent type of valve stem or casing in which the entire stem is of the diameter of the reduced end portion of the type of valve shown in Fig. 1. In this form of the invention the compression member 15 is identical with that shown in Fig. 2, but it is carried in a modified form of screw cap 24 reduced and threaded at 25 to receive the valve stem 26. The upper end of the cap 24 is closed by a threaded plug 27 which carries the cone-shaped anti-friction bearing surface 21 adapted to cooperate with the bearing surface 20.

While the forms of mechanism herein shown and described constitutes preferred embodiments of one form of the invention, it is to be understood that other forms might be adopted and various changes and alterations made in the shape, size, and proportion of the elements therein without departing from the spirit and scope of the invention.

What is claimed is as follows:

1. A valve casing cap provided with threads adapted to engage the cooperating threads of a valve casing; a packing carrying member carried by said cap having a downwardly opening annular groove with packing material therein, the upper end of the valve casing adapted to extend upwardly and fit snugly into said groove and compress the packing therein as the cap is screwed into place; said packing carrying member being rotatably carried by said valve casing cap.

2. A device of the character described comprising, in combination, a threaded valve casing; a valve casing cap provided with threads engaging the cooperating threads of said valve casing; a packing carrying member carried by said cap having a downwardly opening annular groove with packing material therein and receiving the upper end of said valve casing, which latter is adapted to fit snugly into said groove and compress the packing therein as the cap is screwed into place; said packing carrying member being rotatably carried by said valve casing cap.

In testimony whereof I hereto affix my signature.

OTTO M. SUMMERS.